United States Patent
Joo et al.

(10) Patent No.: US 9,246,930 B2
(45) Date of Patent: Jan. 26, 2016

(54) SYSTEM AND METHOD FOR PATTERN MATCHING IN A NETWORK SECURITY DEVICE

(71) Applicant: WINS TECHNET CO., LTD, Seongnam-si (KR)

(72) Inventors: Eun Young Joo, Seoul (KR); Yong Sig Jin, Gunpo-si (KR)

(73) Assignee: WINS Co., Ltd., Seongnam-si (KR)

( * ) Notice: Subject to any disclaimer, the term of this patent is extended or adjusted under 35 U.S.C. 154(b) by 0 days.

(21) Appl. No.: 14/142,428

(22) Filed: Dec. 27, 2013

(65) Prior Publication Data
US 2014/0223564 A1    Aug. 7, 2014

(30) Foreign Application Priority Data
Jan. 4, 2013    (KR) .......................... 10-2013-0001133

(51) Int. Cl.
*H04L 29/06*    (2006.01)
(52) U.S. Cl.
CPC .................................. *H04L 63/1416* (2013.01)
(58) Field of Classification Search
CPC ............ H04L 63/1416; H04L 63/1408; H04L 63/1441; H04L 63/16; H04L 63/145
See application file for complete search history.

(56) References Cited

U.S. PATENT DOCUMENTS

| | | | |
|---|---|---|---|
| 2003/0110393 A1* | 6/2003 | Brock et al. .................. | 713/200 |
| 2005/0111446 A1* | 5/2005 | Greaves et al. ............... | 370/389 |
| 2006/0198375 A1* | 9/2006 | Baik et al. ..................... | 370/392 |
| 2010/0071054 A1* | 3/2010 | Hart ............................... | 726/13 |
| 2010/0242028 A1* | 9/2010 | Weigert ........................ | 717/131 |

FOREIGN PATENT DOCUMENTS

KR    20100013815    2/2010

* cited by examiner

*Primary Examiner* — Hadi Armouche
*Assistant Examiner* — Cheng-Feng Huang
(74) *Attorney, Agent, or Firm* — Joesph H. Kim; JHK Law

(57) ABSTRACT

A pattern matching system for a network security device includes a pattern matching card configured to generate a pattern matching result by matching data of a received packet with a pre-stored pattern of a signature pattern table, and an analyzing engine configured to copy the packet and transfer the copied packet to the pattern matching card and configured to detect a bad traffic based on packet analysis information of the packet and the pattern matching result received from the pattern matching card. The analyzing engine is configured to detect a bad traffic based on a pattern matching result for a single packet and packet analysis information during a single-packet-based analysis and is configured to detect a bad traffic based on a pattern matching result for successive packets and packet analysis information during a multi-packet-based analysis.

9 Claims, 4 Drawing Sheets

SYSTEM AND METHOD FOR PATTERN MATCHING IN A NETWORK SECURITY DEVICE

FIELD OF THE INVENTION

Embodiments disclosed herein relate to a signature pattern matching for increasing a detection rate of bad traffics in a network security device and, more particularly, to a pattern matching system and method for a network security device which is capable of solving a problem of an erroneous detection rate being increased due to simple pattern matching in case where signature patterns are matched through a pattern matching card.

BACKGROUND OF THE INVENTION

In recent years, data transmission and reception through a communication network, especially the Internet, become widespread along with the development of digital processing devices. Among the digital processing devices which transmit and receive data through the communication network, the digital processing device designed to provide data is defined as a server and the digital processing device designed to request and receive data is defined as a client.

In order to detect or block bad traffics which gain access to a server, a network security device such as an IDS (Intrusion Detection System) or an IPS (Intrusion Protection System) can be used. In this network security device, a pattern matching card or an accelerator card which stores signature patterns can be used in order to rapidly detect signature patterns of bad traffics.

However, due to the use of simple pattern matching between a card and an analyzing engine, the conventional method is difficult to cope with patterns which grow complex and is suffering from a high erroneous detection rate.

SUMMARY OF THE INVENTION

In view of the aforementioned problems inherent in the prior art, the disclosed pattern matching system and method can increase a signature pattern detection rate by virtue of organic combination of the hardware (pattern matching card) and the software (analyzing engine) of a network security device.

And the disclosed pattern matching system and method can effectively cope with complex signature patterns.

According to one aspect of the disclosed embodiment, there is provided a pattern matching system for a network security device, including: a pattern matching card configured to generate a pattern matching result by matching data of a received packet with a pre-stored pattern of a signature pattern table; and an analyzing engine configured to copy the packet and transfer the copied packet to the pattern matching card and configured to detect a bad traffic based on packet analysis information of the packet and the pattern matching result received from the pattern matching card, wherein the analyzing engine is configured to detect a bad traffic based on a pattern matching result for a single packet and packet analysis information during a single-packet-based analysis and is configured to detect a bad traffic based on a pattern matching result for successive packets and packet analysis information during a multi-packet-based analysis.

In the system stated above, the analyzing engine may include: a protocol analyzing engine configured to analyze a protocol of a packet to generate packet analysis information; a rule analyzing engine configured to generate a pattern matching table, based on a pattern matching result for a single packet or a pattern matching result for successive packets, and configured to compare the pattern matching table and the packet analysis information with a pre-stored rule; and a detecting/blocking engine configured to detect or block a bad traffic based on an analysis result of the rule analyzing engine.

In the system stated above, the pattern matching result may contain index information for a matched pattern and offset information indicating a position of the matched pattern.

In the system stated above, the packet analysis information may contain at least one of a protocol in use, a source IP address, a source port number, a destination IP address, a destination port number and session information.

In the system stated above, the rule analyzing engine may be configured to generate a pattern matching table for each packet, if a flag value is set as a value for a single-packet-based analysis, and to generate a pattern matching table based on the pattern matching result for successive packets, if the flag value is set as a value for a multi-packet-based analysis.

In the system stated above, the rule analyzing engine may be configured to determine whether the pattern of the pattern matching table and the packet analysis information are matched with the pre-stored rule.

According to another aspect of the disclosed technology, there is provided a pattern matching method for a network security device, including the steps of: (a) analyzing a packet in an analyzing engine to generate packet analysis information, copying the packet and transferring the copied packet to a pattern matching card; (b) matching data of the packet with a pre-stored pattern of a signature pattern table in the pattern matching card and transferring a pattern matching result to the analyzing engine; and (c) detecting, in the analyzing engine, a bad traffic based on the packet analysis information and the pattern matching result, wherein the step (c) includes the steps of: (c-1) if an analysis criterion is set to a single-packet-based analysis, comparing the pattern matching result for each packet and the packet analysis information with a pre-stored rule; and (c-2) detecting or blocking a bad traffic based on a result of comparison with the pre-stored rule.

In the method stated above, the step (c-1) may include the steps of: generating a pattern matching table based on the pattern matching result for each packet; and determining whether the pattern of the pattern matching table and the packet analysis information are matched with the pre-stored rule.

In the method stated above, the step (c) may include the steps of: if the analysis criterion is set to a multi-packet-based analysis, comparing the pattern matching result for successive packets and the packet analysis information with the pre-stored rule; and detecting or blocking a bad traffic based on a result of comparison with the pre-stored rule.

In the method stated above, the step of comparing the pattern matching result may include the steps of: generating a pattern matching table based on the pattern matching result for the successive packets; and determining whether the pattern of the pattern matching table and the packet analysis information are matched with the pre-stored rule.

The pattern matching system and method for a network security device according to the disclosed technology does not merely perform simple pattern matching but enables the hardware (pattern matching card) and the software (analyzing engine) of a network security device to operate in cooperation with each other. This makes it possible to increase a detection rate of signature patterns.

In addition to the pattern matching card, the software rule is used in detecting a bad traffic. This makes it possible to set a complex signature pattern rule and to increase a detection rate.

Since the software rule can be supplemented with ease, it is possible for the network security device to flexibly cope with a complex signature pattern.

Moreover, signature patterns dispersed in different packets can be detected through a multi-packet-based analysis.

DETAILED DESCRIPTION

Description on certain embodiments of the disclosed technology will now be made to explain structures and functions of the disclosed technology. Since the embodiments are presented merely for the sake of illustration, the scope of the disclosed technology shall not be limited by the embodiments described herein. In other words, the embodiments of the disclosed technology may be modified in many different forms. It is to be understood that the scope of the disclosed technology encompass the equivalents capable of realizing the technical concept of the disclosed technology.

It should be noted that the singular form used in the following description includes a plural form unless specifically mentioned otherwise. It should be appreciated that the terms "comprise", "include", "have", and the like used herein are intended to merely indicate the existence of a feature, a number, a step, an operation, a component, a part or a combination thereof and are not intended to exclude the existence or addition of one or more other features, numbers, a step, operations, components, parts or combinations thereof.

Individual steps described herein may occur in an order different than the stated order unless specifically mentioned otherwise. In other words, individual steps may be performed in the stated order, substantially at the same time, or in the reverse order.

A system and method for pattern matching in a network security device will now be described in detail with reference to the accompanying drawings.

Figure 1:
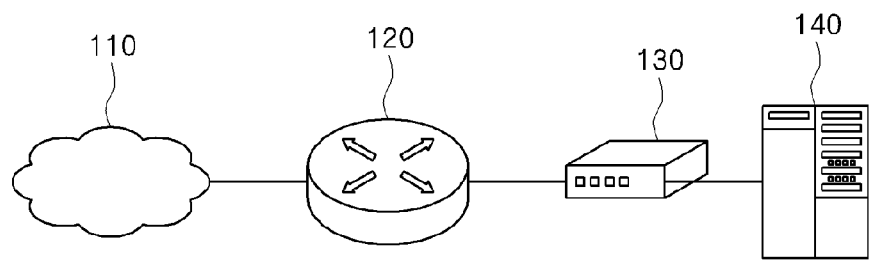
FIG. 1 is a configuration view showing a typical network configuration.

FIG. 1 is a configuration view showing a typical network configuration. As shown in FIG. 1, a server 140 is connected to an external network 110 via a router 120. A network security device 130 for protecting the server 140 from bad traffics is provided between the server 140 and the external network 110. For example, an IDS (Intrusion Detection System) or an IPS (Intrusion Protection System) can be used as the network security device 130 in order to detect or block bad traffics which gain access to the server 140.

As a method of detecting bad traffics in the network security device 130, it is possible to use a behavior-based detection method, a signature-based detection method, and so forth. The behavior-based detection method is a method of detecting bad traffics based on the behaviors occurring in a system. The behavior-based detection method can actively cope with an unknown attack but shows a high erroneous detection rate. The signature-based detection method is a method in which bad traffics are detected by comparing inflow data streams with signatures or strings held in security equipment. The signature-based detection method has an advantage in that it can accurately detect bad traffics at an increased scan speed. However, the signature-based detection method is vulnerable to an unknown attack.

In case where bad traffics are detected by the signature-based detection method, the network security device 130 can use a pattern matching card or an accelerator card, which stores different signature patterns, in order to rapidly detect signatures.

Figure 2:
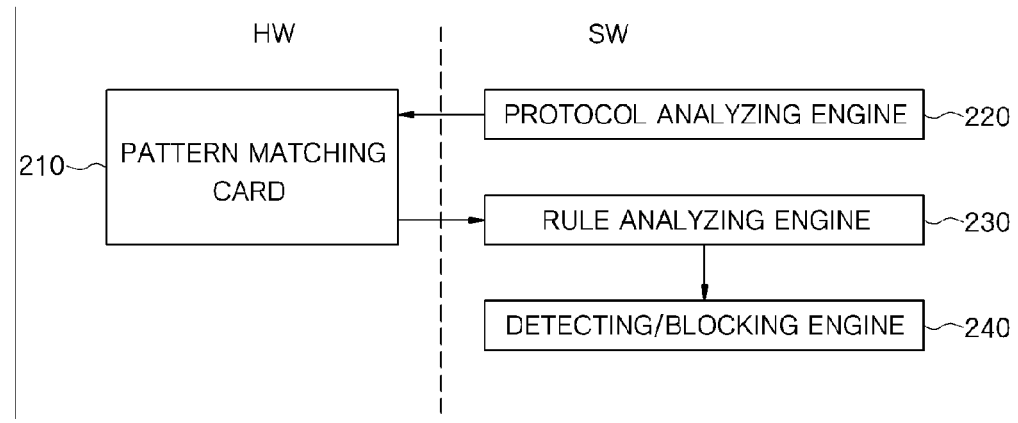
FIG. 2 is a configuration view showing a detailed configuration of a pattern matching system for a network security device according to the disclosed technology.

FIG. 2 is a configuration view showing the detailed configuration of the pattern matching system for a network security device according to the disclosed embodiment. The pattern matching system for a network security device includes a pattern matching card 210, a protocol analyzing engine 220, a rule analyzing engine 230 and a detecting/blocking engine 240.

The pattern matching system for a network security device can be divided into a hardware section which includes the pattern matching card 210 and a software section which includes the protocol analyzing engine 220, the rule analyzing engine 230 and the detecting/blocking engine 240.

The pattern matching card 210 stores a signature pattern table containing different signature patterns. The pattern matching card 210 serves to match the data of a packet received from the protocol analyzing engine 220 with one of the patterns of the signature pattern table. The pattern matching card 210 transfers the pattern matching result to the rule analyzing engine 230. The pattern matching result contain index information on the matched pattern and offset information indicating the position of the matched pattern. In one embodiment, a network interface card (NIC) can be used as the pattern matching card 210.

Analyzing engines include the protocol analyzing engine 220, the rule analyzing engine 230 and the detecting/blocking engine 240. The analyzing engines serve to copy a packet and transfer the copied packet to the pattern matching card 210 and also serve to detect or block bad traffics based on the packet analysis information and the pattern matching result received from the pattern matching card 210.

The protocol analyzing engine 220 reads a received packet and analyzes a protocol thereof, thereby generating packet analysis information. In one embodiment, the protocol analyzing engine 220 analyzes the header of a packet to extract at least one of a protocol in use, a source IP address, a source port number, a destination IP address, a destination port number and session information, thereby generating packet analysis information. Moreover, the protocol analyzing engine 220 can extract the sequence information of a packet.

The rule analyzing engine 230 generates a pattern matching table based on the pattern matching result for a single packet or the pattern matching result for successive packets.

Then, the rule analyzing engine 230 compares the pattern matching table and the packet analysis information with a pre-stored rule to determine whether the pattern matching table and the packet analysis information are matched with the pre-stored rule.

The detecting/blocking engine 240 detects or blocks bad traffics based on the analysis result of the rule analyzing engine 230.

The protocol analyzing engine 220, the rule analyzing engine 230 and the detecting/blocking engine 240 are divided for the sake of convenience depending on the functions of individual processing blocks of the system and may be further divided or combined together depending on the realization examples. In one embodiment, the respective engines may be formed into a software module.

During a single-packet-based analysis, the pattern matching system for a network security device according to the disclosed embodiment detects bad traffics based on the pattern matching result and packet analysis information for a single packet. During a multiple-packet-based analysis, the pattern matching system detects bad traffics based on the pattern matching result and packet analysis information for successive packets. The operation of the pattern matching system will now be described in detail with reference to FIGS. 3 to 6.

Figure 3:
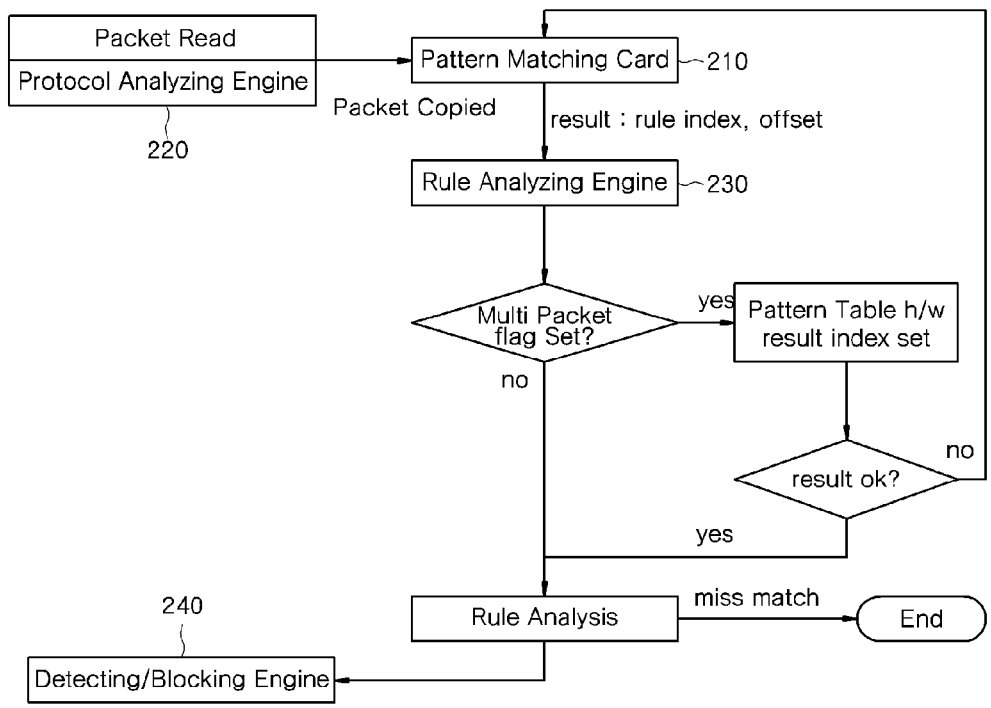
FIG. 3 is a flowchart illustrating a pattern matching flow in the pattern matching system for a network security device according to the disclosed embodiment.

FIG. 3 is a flowchart illustrating a pattern matching flow in the pattern matching system for a network security device according to the disclosed embodiment. If a packet is received by the network security device, the protocol analyzing engine 220 reads the received packet and analyzes the protocol thereof, thereby generating packet analysis information. The packet analysis information and the pattern matching result can be used as data for the determination of bad traffics in the rule analyzing engine 230.

The protocol analyzing engine 220 copies the received packet and transfers the copied packet to the pattern matching card 210. The pattern matching card 210 matches the data of the received packet with one of the patterns of the signature pattern table and delivers the pattern matching result to the rule analyzing engine 230. At this time, the pattern matching card 210 can convert the pattern matching result to a bit set and can transfer the bit set to the rule analyzing engine 230. In one embodiment, the pattern matching result may contain index information for the matched pattern and offset information indicating the position of the matched pattern.

The rule analyzing engine 230 generates a pattern matching table based on the received pattern matching result and compares the pattern matching table and the packet analysis information with a pre-stored rule. At this time, the rule analyzing engine 230 generates the pattern matching table in two analysis modes, namely a single-packet-based analysis mode and a multiple-packet-based analysis mode.

In order to distinguish the analysis modes, the rule analyzing engine 230 can set a multi-packet flag value. In one embodiment, if a packet contains sequence information indicating a series of data, the rule analyzing engine 230 can set the flag value as a value for a multi-packet-based analysis. If a packet does not contain sequence information, the rule analyzing engine 230 can set the flag value as a value for a single-packet-based analysis.

In case where the flag value is set as a value for a single-packet-based analysis, the rule analyzing engine 230 generates a pattern matching table with respect to each packet and compares the pattern matching table with a pre-stored rule.

Figure 4:
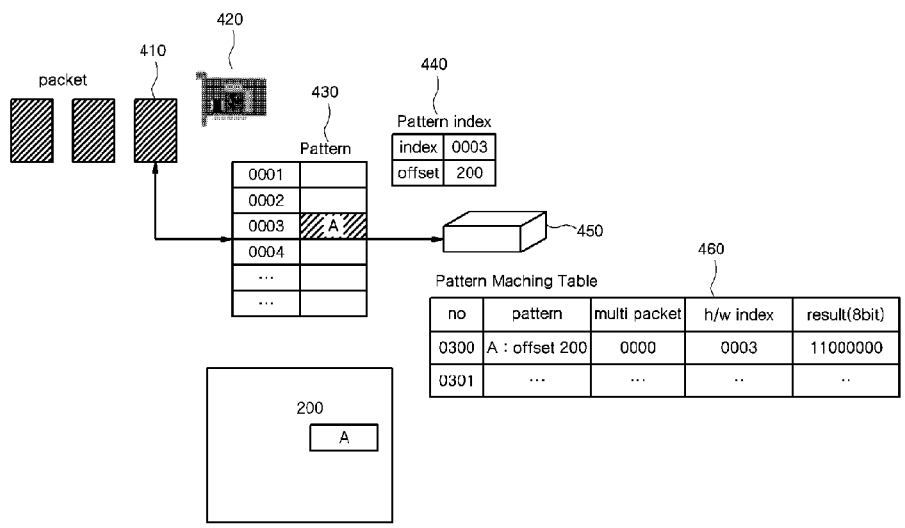
FIG. 4 is a view showing a single pattern matching method for a network security device according to the disclosed embodiment, which makes use of a single-packet-based analysis.
Figure 5:
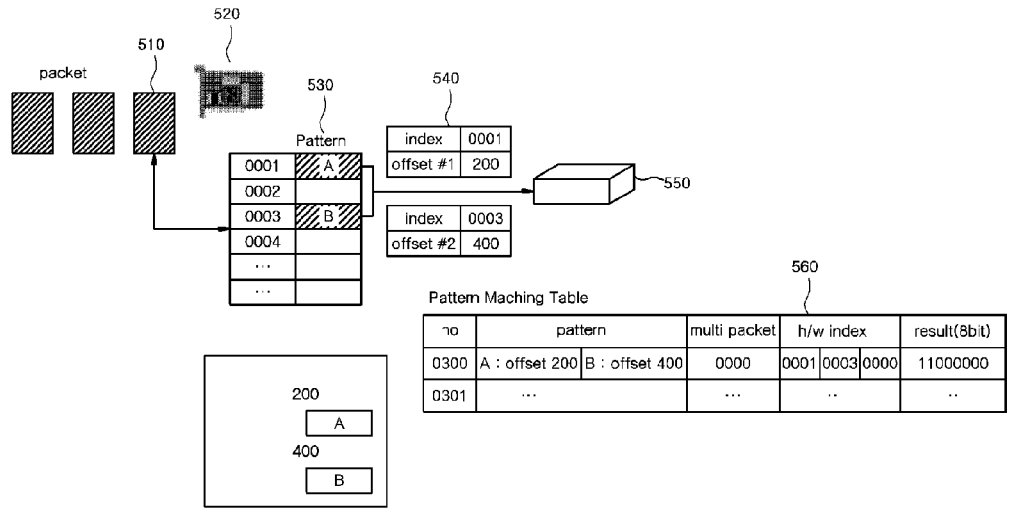
FIG. 5 is a view showing a multiple pattern matching method for a network security device according to the disclosed embodiment, which makes use of a single-packet-based analysis.

FIG. 4 is a view showing a single pattern matching method for a network security device according to the disclosed embodiment, which makes use of a single-packet-based analysis. FIG. 5 is a view showing a multiple pattern matching method for a network security device according to the disclosed embodiment, which makes use of a single-packet-based analysis.

Upon receiving a packet 410 or 510, the pattern matching card 420 or 520 matches the data of the received packet with one of the patterns of the signature pattern table 430 or 530 and transfers the pattern matching result (index information and offset information) 440 or 540 to the rule analyzing engine 450 or 550. The signature pattern table 430 or 530 contains at least one signature pattern and an index value corresponding to the signature pattern.

In single pattern matching, one pattern of the packet is matched with the signature pattern of the signature pattern table 430 as shown in FIG. 4. Assuming that the received packet 410 contains a pattern A spaced apart by a distance 200 from a reference position, the pattern matching card 420 converts the index information (0003) and the offset information (200) of the pattern A to a bit set and transfers the bit set to the rule analyzing engine 450. The rule analyzing engine 450 sets a multi-packet flag value as a value for a single-packet-based analysis. The rule analyzing engine 450 receives the pattern matching result and generates a pattern matching table 460.

In multi-pattern matching, two or more patterns of the packet are matched with the signature patterns of the signature pattern table 530 as shown in FIG. 5. Assuming that the received packet 510 contains a pattern A spaced apart by a distance 200 from a reference position and a pattern B spaced apart by a distance 400 from the reference position, the pattern matching card 520 converts the index information (0001) and the offset information (200) of the pattern A and the index information (0003) and the offset information (400) of the pattern B to bit sets and transfers the bit sets to the rule analyzing engine 550. The rule analyzing engine 550 sets the multi-packet flag value as a value for a single-packet-based analysis. The rule analyzing engine 550 receives the pattern matching result and generates a pattern matching table 560. In case of the multi-pattern matching, a plurality of pattern matching results may be contained in a single pattern matching table 560.

In case where the flag value is set as a value for a multi-packet-based analysis, the rule analyzing engine 230 generates a pattern matching table based on the pattern matching results with respect to the successive packets corresponding to the number of sequences and compares the pattern matching table with a pre-stored rule. In other words, if the flag value is set as a value for a multi-packet-based analysis, the rule analyzing engine 230 updates the pattern matching table by receiving the pattern matching results until the pattern matching table is completed.

Figure 6:
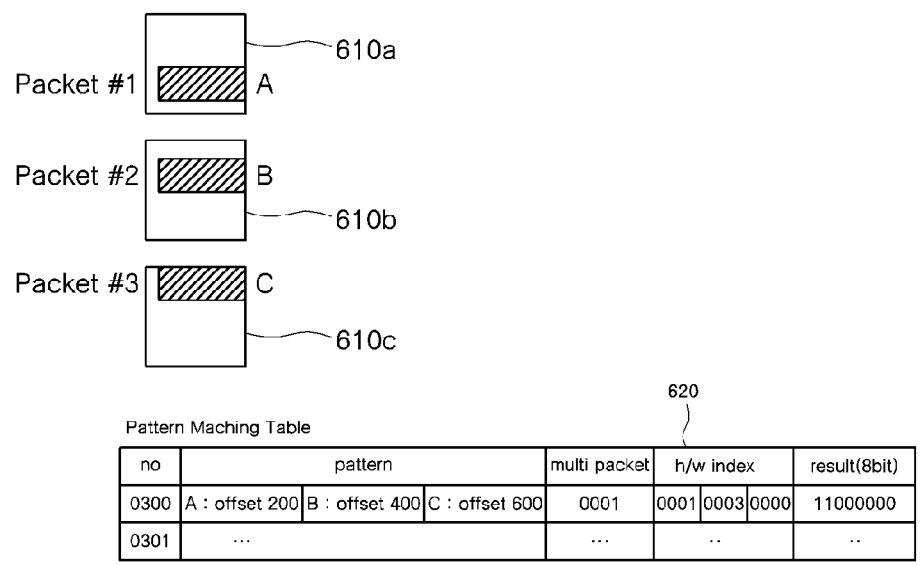
FIG. 6 is a view showing a pattern matching method for a network security device according to the disclosed embodiment, which makes use of a multiple-packet-based analysis.

FIG. 6 is a view showing a pattern matching method for a network security device according to the disclosed embodiment, which makes use of a multiple-packet-based analysis. If the sequence information of a packet is equal to 3, data can be received with the packet divided into three packets, namely first to third packets 610*a*, 610*b* and 610*c*. It is assumed that the first packet 610*a* contains a pattern A spaced apart by a distance 200 from a reference position. The second packet 610*b* contains a pattern B spaced apart by a distance 400 from the reference position. The third packet 610*c* contains a pattern C spaced apart by a distance 600 from the reference position.

Upon receiving the first packet 610*a*, the pattern matching card converts the index information (0001) and the offset information (200) of the pattern A to a bit set and transfers the bit set to the rule analyzing engine. The rule analyzing engine sets the multi-packet flag value as a value for a multi-packet-based analysis and generates a pattern matching table 620 by receiving the pattern matching results. The rule analyzing engine waits until the entire pattern matching results for the packets are received and until the pattern matching table 620 is completed.

Upon receiving the second packet 610*b*, the pattern matching card converts the index information (0003) and the offset information (400) of the pattern B to a bit set and transfers the bit set to the rule analyzing engine. The rule analyzing engine reflects the received pattern matching result into the pattern matching table 620, thereby updating the pattern matching table 620. Upon receiving the third packet 610*c*, the pattern matching card converts the index information (0000) and the offset information (600) of the pattern C to a bit set and transfers the bit set to the rule analyzing engine. The rule analyzing engine reflects the received pattern matching result into the pattern matching table 620, thereby updating the pattern matching table 620.

If the entire pattern matching results for the packets are received and if the pattern matching table 620 is completed, the rule analyzing engine compares the pattern matching table 620 with a pre-stored rule. In one embodiment, the rule analyzing engine may distinguish sessions of the packets using the packet analysis information and may perform a multiple-packet-based analysis based on the packets received in the same session.

If the pattern matching table is generated, the rule analyzing engine 230 compares the pattern matching table and the packet analysis information with a pre-stored rule to determine whether the pattern matching table and the packet analysis information are matched with the pre-stored rule. The rule can be set in advance by a user and can be stored in the rule analyzing engine 230. The rule can be updated by a user. The user can create the rule using only the pattern matching result or using the pattern matching result and the packet analysis information in combination. This makes it possible to accurately set the rule.

For example, it is possible to set a rule by which the packet containing a pattern A in a 200 position is detected as a bad packet or a rule by which the packet containing a pattern A in a 200 position among the traffics received through 80 ports using a TCP protocol is detected as a bad packet.

In case where a packet is not matched with the rule of the rule analyzing engine 230, the analysis for that packet is finished. If a packet is matched with the rule of the rule analyzing engine 230, the detecting/blocking engine 240 detects the packet as a bad traffic or blocks the packet.

As described above, the pattern matching system for a network security device according to the disclosed embodiment has an advantageous effect in that signature patterns dispersed in different packets can be detected through a multi-packet-based analysis.

Furthermore, use of the pattern matching result of the pattern matching card and the software rule makes it possible to set a complex signature pattern rule and to increase a detection rate. Since the rule can be supplemented with ease, it is possible to flexibly cope with a complex signature pattern.

Figure 7:
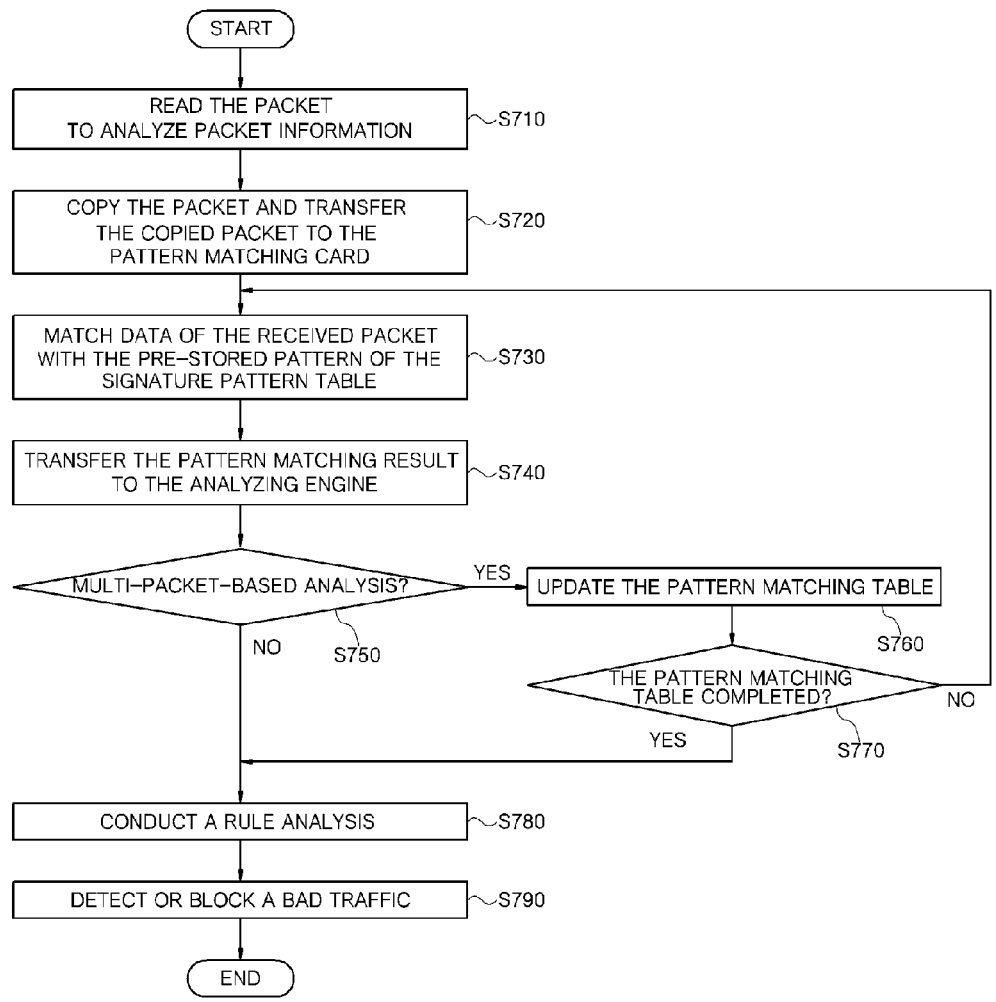
FIG. 7 is a flowchart illustrating a pattern matching method for a network security device according to the disclosed embodiment.

FIG. 7 is a flowchart illustrating a pattern matching method for a network security device according to the disclosed embodiment.

Upon receiving a packet, the analyzing engine reads and analyzes the packet, thereby generating packet analysis information (step S710). Then, the analyzing engine copies the packet and transfers the copied packet to the pattern matching card (step S720). In one embodiment, the packet analysis information contains at least one of a protocol in use, a source IP address, a source port number, a destination IP address, a destination port number and session information.

The pattern matching card matches data of the received packet with the pre-stored pattern of the signature pattern table (step S730) and transfers the pattern matching result to the analyzing engine (step S740). In one embodiment, the pattern matching result contains index information for the matched pattern and offset information indicating the position of the matched pattern.

Upon receiving the pattern matching result, the analyzing engine detects a bad traffic based on the packet analysis information and the received pattern matching result.

At this time, the analyzing engine checks the flag value to determine whether the flag value is set as a value for a multi-packet-based analysis or as a value for a single-packet-based analysis (step S750). If the flag value is set as a value for a single-packet-based analysis (if No in step S750), the pattern matching results for the respective packets and the packet analysis information are compared with a pre-stored rule (step S780).

In other words, during the single-packet-based analysis, the analyzing engine generates a pattern matching table based on the pattern matching results for the respective packets and determines whether the pattern matching table and the packet analysis information are matched with a pre-stored rule.

If the flag value is set as a value for a multi-packet-based analysis (if Yes in S750), the analyzing engine compares the pattern matching results for the successive packets and the packet analysis information with a pre-stored rule.

In other words, the analyzing engine receives the pattern matching results for the successive packets and updates the pattern matching table (step S760). If the pattern matching table is completed (if Yes in step S770), a rule analysis is conducted to make sure that the pattern matching table and the packet analysis information are matched with a pre-stored rule (step S780). If the pattern matching table is not completed (if No in step S770), the flow returns to step S730.

If the pattern matching table and the packet analysis information are matched with the pre-stored rule, the analyzing engine detects the traffic containing the relevant packet as a bad traffic or blocks the traffic (step S790).

As described above, the pattern matching method for a network security device according to the disclosed embodiment does not merely perform simple pattern matching but enables the hardware and the software of a network security device to operate in cooperation with each other. This makes it possible to increase a detection rate of signature patterns.

Moreover, the present pattern matching method has an advantageous effect in that signature patterns dispersed in different packets can be detected through a multi-packet-based analysis.

While certain embodiments of the disclosed technology have been described above, the disclosed embodiment is not limited thereto but may be modified in many different forms without departing from the technical concept of the disclosed embodiment.

What is claimed is:

1. A pattern matching system for a network security device, comprising:
   a hardware pattern matching card configured to generate a pattern matching result by matching data of a received packet with a pre-stored pattern of a signature pattern table; and
   an analyzing engine configured to copy the packet and transfer the copied packet to the pattern matching card and configured to detect a bad traffic based on packet analysis information of the packet and the pattern matching result received from the pattern matching card, wherein the analyzing engine is configured to detect a bad traffic based on a pattern matching result for a single packet and packet analysis information during a single-packet-based analysis and is configured to detect a bad traffic based on a pattern matching result for successive packets and packet analysis information during a multi-packet-based analysis, and wherein the analyzing engine comprises: a protocol analyzing engine configured to analyze a protocol of the packet to generate packet analysis information; a rule analyzing engine configured to generate a pattern matching table, based on a pattern matching result for a single packet or a pattern matching result for successive packets, and configured to compare the pattern matching table and the packet analysis information with a pre-stored rule; and a detecting/blocking engine configured to detect or block a bad traffic based on an analysis result of the rule analyzing engine, and wherein, if one pattern of the received packet is matched, the pattern matching card is configured to convert the index information and the offset information of the pattern to a bit set and transfer the bit set to the rule analyzing engine, and if two or more patterns of the received packet are matched, the pattern matching card is configured to convert the index information and the offset information of each pattern to bit sets and transfers the bit sets to the rule analyzing engine.

2. The system of claim 1, wherein the pattern matching result contains index information for a matched pattern and offset information indicating a position of the matched pattern.

3. The system of claim 1, wherein the packet analysis information contains at least one of a protocol in use, a source IP address, a source port number, a destination IP address, a destination port number and session information.

4. The system of claim 1, wherein the rule analyzing engine is configured to generate a pattern matching table for each packet, if a flag value is set as a value for a single-packet-based analysis, and to generate a pattern matching table based on the pattern matching result for successive packets, if the flag value is set as a value for a multi-packet-based analysis.

5. A pattern matching method for a network security device, comprising the steps of:
(a) analyzing a packet in an analyzing engine to generate packet analysis information, copying the packet and transferring the copied packet to a pattern matching card;
(b) matching data of the packet with a pre-stored pattern of a signature pattern table in the pattern matching card and transferring a pattern matching result to the analyzing engine; and
(c) detecting, in the analyzing engine, a bad traffic based on the packet analysis information and the pattern matching result, wherein the step (c) comprises the steps of: (c-1) if an analysis criterion is set to a single-packet-based analysis, comparing the pattern matching result for each packet and the packet analysis information with a pre-stored rule and (c-2) detecting or blocking a bad traffic based on a result of comparison with the pre-stored rule, wherein the step (c-1) comprises the steps of: generating a pattern matching table based on the pattern matching result for each packet; and determining whether the pattern of the pattern matching table and the packet analysis information are matched with the pre-stored rule, and wherein, if one pattern of the received packet is matched, the pattern matching card is configured to convert the index information and the offset information of the pattern to a bit set and transfer the bit set to the rule analyzing engine, and if two or more patterns of the received packet are matched, the pattern matching card is configured to convert the index information and the offset information of each pattern to bit sets and transfer the bit sets to the rule analyzing engine.

6. The method of claim 5, wherein the step (c) comprises the steps of: if the analysis criterion is set to a multi-packet-based analysis, comparing the pattern matching result for successive packets and the packet analysis information with the pre-stored rule; and detecting or blocking a bad traffic based on a result of comparison with the pre-stored rule.

7. The method of claim 6, wherein the step of comparing the pattern matching result comprises the steps of: generating a pattern matching table based on the pattern matching result for the successive packets; and determining whether the pattern of the pattern matching table and the packet analysis information are matched with the pre-stored rule.

8. The method of claim 5, wherein the pattern matching result contains index information for a matched pattern and offset information indicating a position of the matched pattern.

9. The method of claim 5, wherein the packet analysis information contains at least one of a protocol in use, a source IP address, a source port number, a destination IP address, a destination port number and session information.

* * * * *